US010339850B2

(12) United States Patent
Greer, III

(10) Patent No.: US 10,339,850 B2
(45) Date of Patent: Jul. 2, 2019

(54) LOW-LATENCY DISPLAY

(71) Applicant: NVIDIA Corporation, Santa Clara, CA (US)

(72) Inventor: Thomas Hastings Greer, III, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 205 days.

(21) Appl. No.: 14/940,067

(22) Filed: Nov. 12, 2015

(65) Prior Publication Data
US 2017/0039926 A1    Feb. 9, 2017

Related U.S. Application Data

(60) Provisional application No. 62/202,117, filed on Aug. 6, 2015.

(51) Int. Cl.
G09G 3/20       (2006.01)
G09G 3/3225    (2016.01)
(Continued)

(52) U.S. Cl.
CPC ....... *G09G 3/2014* (2013.01); *G02B 27/0172* (2013.01); *G09G 3/001* (2013.01);
(Continued)

(58) Field of Classification Search
CPC .. G09G 3/01; G09G 3/20; G09G 3/32; G09G 3/34; G09G 3/36; G09G 3/2014;
(Continued)

(56) References Cited

U.S. PATENT DOCUMENTS

2006/0109389 A1*  5/2006  Ichikawa ............... G09G 3/342
                                                                     349/1
2008/0211578 A1*  9/2008  Morishima .......... H02M 3/157
                                                                     341/143
(Continued)

FOREIGN PATENT DOCUMENTS

CN    103959365 A    7/2014
CN    104781870 A    7/2015
(Continued)

OTHER PUBLICATIONS

Jang, J. H. et al., "A PDM-Based Digital Driving Technique Using Delta-Sigma (ΔΣ) Modulation for QVGA Full-Color AMOLED Display Applications," Journal of Display Technology, vol. 6 No. 7, Jul. 2010, pp. 269-278.
(Continued)

*Primary Examiner* — Lunyi Lao
*Assistant Examiner* — Johny Lau
(74) *Attorney, Agent, or Firm* — Leydig, Voit & Mayer, Ltd.

(57) ABSTRACT

A method, computer readable medium, and system generate a low-latency image for display. The method includes the steps of receiving a portion of an image for display, selecting a pulse-width value for displaying the portion of the image, and driving a display device to present the portion of the image using a pulse-width value and pulse density modulation value. Logic circuits for implementing the method may be included in a graphics processing unit or within a display device. The portion of the image for display may be rendered based on real-time position information associated with a head-mounted display.

19 Claims, 7 Drawing Sheets

(51) Int. Cl.
*G02B 27/01* (2006.01)
*G09G 3/00* (2006.01)

(52) U.S. Cl.
CPC ......... *G09G 3/2018* (2013.01); *G09G 3/3225* (2013.01); *G09G 2354/00* (2013.01)

(58) Field of Classification Search
CPC .... G09G 3/3225; G09G 3/001; G09G 3/2018; G09G 2354/00; H03F 3/217; H05B 37/02; H05B 41/36; H03M 3/372; G02F 1/13; G02F 27/0172
See application file for complete search history.

(56) References Cited

U.S. PATENT DOCUMENTS

| | | | | |
|---|---|---|---|---|
| 2010/0201883 A1* | 8/2010 | Delva | ................. | G06T 5/50 348/607 |
| 2011/0291584 A1* | 12/2011 | Filippo | ................. | G06F 7/602 315/291 |
| 2013/0093358 A1* | 4/2013 | Lin | ................. | H05B 33/086 315/307 |
| 2014/0092116 A1* | 4/2014 | Ofili | ................. | G06T 3/4015 345/589 |
| 2015/0270848 A1* | 9/2015 | Sakata | ................. | G10H 1/34 84/744 |
| 2015/0302795 A1* | 10/2015 | Genoe | ................. | G09G 3/2018 345/691 |
| 2016/0133201 A1* | 5/2016 | Border | ................. | G02B 27/283 345/694 |

FOREIGN PATENT DOCUMENTS

TW 201123135 A 7/2011
TW 201401252 A 1/2014

OTHER PUBLICATIONS

Office Action from Tawainese Application No. 10720273250, dated Mar. 29, 2018.

\* cited by examiner

LOW-LATENCY DISPLAY

CLAIM OF PRIORITY

This application claims the benefit of U.S. Provisional Application No. 62/202,117 titled "Low-Latency Display," filed Aug. 6, 2015, the entire contents of which is incorporated herein by reference.

FIELD OF THE INVENTION

The present invention relates to display systems, and more particularly to a low-latency display.

BACKGROUND

A head-mounted display system tracks user head motion relative to a rendered scene and updates the rendered scene in real time based on the head motion. Such head-mounted display systems can provide a visually immersive virtual-reality experience. However, most users are extremely sensitive to total latency, measured from head motion to corresponding display update. Total latencies as low as 10 milliseconds commonly produce unpleasant user experiences, and can even provoke nausea and general discomfort. Furthermore, conventional techniques for rendering and displaying images within a head-mounted display system may caused perceived blurring of fine detail on what should be seen as fine, stationary image detail when a user moves their head. Such blurring may occur when total latencies exceed innate vestibulo-ocular reflex response times.

Conventional rendering systems generate whole frames and display the frames at fixed refresh rates ranging from 60 Hz (16.6 milliseconds) to 120 Hz (8.3 milliseconds), leaving no latency budget or very little latency budget for associated motion sensing and image rendering. Consequently, conventional rendering systems may cause perceived blurring and commonly provoke nausea or other unpleasant experiences in users. Thus, there is a need for addressing these issues and/or other issues associated with the prior art.

SUMMARY

A method, computer readable medium, and system generate a low-latency image for display. The method includes the steps of receiving a portion of an image for display, selecting a pulse-width value for displaying the portion of the image, and driving a display device to present the portion of the image using a pulse-width value and pulse density modulation value. Logic circuits for implementing the method may be included in a graphics processing unit or within a display device.

DETAILED DESCRIPTION

Figure 1:
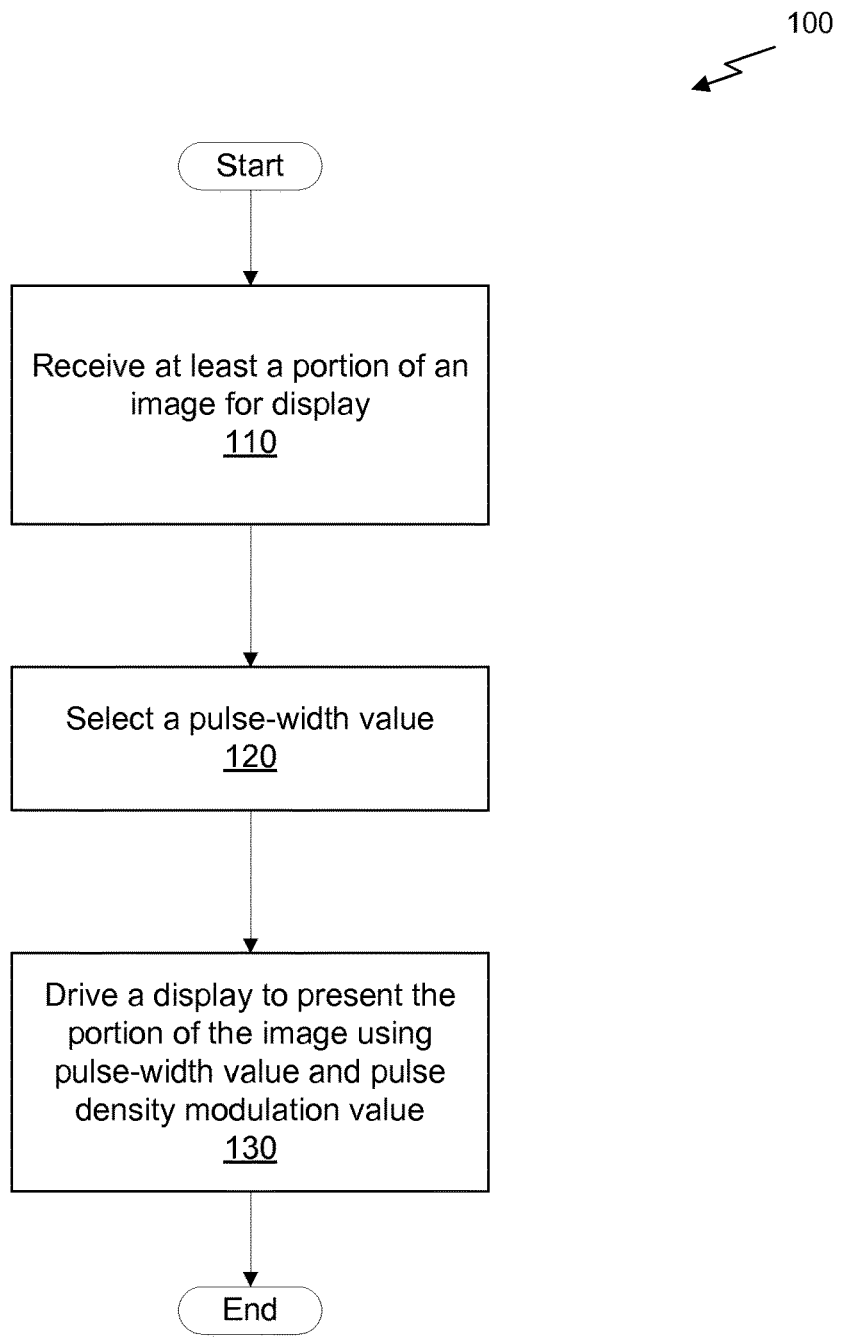
FIG. 1 illustrates a flowchart of a method for operating a low-latency display, in accordance with one embodiment.

A head-mounted display device includes one or more instances of a low-latency display subsystem configured to generate optical images from corresponding video signals comprising rows of video data. A graphics processing unit (GPU) renders the rows of video data based on real-time position information, which may be updated after one or more rows of video data are transmitted to the low-latency display subsystem. In one embodiment, a position sensing unit provides the real-time position information, which may correspond to camera positions for each of the one or more instances of the low-latency display subsystem. A modulation function converts multi-level intensity values associated with pixel color channels (e.g., red, green, blue color channels) to binary values presented over sequential frame times by the pixel. The binary values may correspond to on or off states for each of the color channels for a pixel. For example, a pixel may include red, green, and blue organic light-emitting-diode (OLED) elements that are each driven either substantially fully on or fully off in any particular frame, wherein an average intensity of each OLED element is determined by a corresponding multi-level intensity value. The output of the modulation function represents a density modulation value having an on state or an off state at any instance of time.

Certain display technologies provide extremely fast electrical to photonic conversion suitable for head-mounted display devices. In particular, active-matrix organic light-emitting diode (AMOLED) displays provide electrical to photonic conversion times in the sub-microsecond range, enabling a given row of video data to be presented in similar time scales. An AMOLED display includes a two-dimensional matrix of pixels comprising OLED elements. Rows of pixels are fabricated along one dimension of the two-dimensional matrix, wherein each row includes pixels organized in columns another dimension of the two-dimensional matrix.

In general, two modulation techniques, pulse density modulation (PDM) and pulse width modulation (PWM) may be combined to drive a display, such as an AMOLED display, with low latency. An underlying assumption is that some display device technologies (e.g., AMOLED displays), can be driven with binary (on/off) images at a much higher rate than with full intensity resolution (e.g., 10-bit) images. As an example, a commercially available AMOLED panel designed to be driven at 60 frames per second with 10-bit images can instead be driven at 1700 frames per second with binary images.

While driving the display at 1700 frames per second may reduce total latency to near zero (e.g., sub-millisecond) latency, the technique comes at a cost. Low value pixels (extremely dim intensity colors) are displayed with a noticeable 'twinkle' unless the PDM frame rate is impracticably high (e.g., well over 10K frames per second). A modified PDM algorithm selects from a palette of globally selected pulse widths. That is, all of the pixels in a particular frame are either off or have a pulse width chosen for the particular frame. In one embodiment, the selected pulse widths follow a 16-frame repeating pattern specified by a sequence.

A technique that combines PDM and PWM displays a 10-bit dynamic range of pixel values with no noticeable twinkle, but unfortunately the technique may introduce another image artifact, motion-blur-like tails on objects that are moving in 'retina space' (moving across the user's retina). To reduce or eliminate perceptible motion-blur-like tails, the state of the PDM modulator can be transferred from pixel to pixel such that the PDM state is fixed (within pixel resolution) in retina space. In one embodiment, pixel screen-space velocity vectors provided by the image generation pipeline are combined with eye-tracking data to direct the transfer of the state of the PDM modulator. In one embodiment, the pixel velocity vectors are also used by a screen space warp engine within the GPU to perform temporal up-sampling on 50-100 Hz frames to extrapolate approximately 2 KHz frames for display.

Embodiments of the present invention implement a global intensity pattern for sequential frames that reduces idle pattern flicker associated with delta-sigma modulation functions. Furthermore, delta-sigma state may be displaced in screen space for each low-latency display subsystem to account for movement, such as scene object movement, head movement, eye movement, or any combination thereof.

FIG. 1 illustrates a flowchart of a method 100 for operating a low-latency display, in accordance with one embodiment. Although the method 100 is described in conjunction with the systems of FIGS. 2 and 3, any display system that implements method 100 is within the scope and spirit of embodiments of the present invention. In one embodiment, method 100 is implemented by a control unit, such as control unit 230 of FIG. 2. The control unit may be incorporated within a low-latency display device, such as low-latency display 210. Alternatively, the control unit may be implemented within a GPU, such as GPU 250, coupled to a display device. In one embodiment, method 100 is configured to provide a frame rate of at least one-thousand seven-hundred frames per second.

At step 110, the control unit receives at least a portion of an image for display in the current display frame. In one embodiment, the portion of an image comprises a row of pixel data, comprising target intensity data for each pixel within a row of pixels. The target intensity data may be defined by an arbitrary number of quantization levels. For example, ten bits of intensity information may define two to the tenth power (one-thousand twenty-four) quantization levels of intensity for an associated color channel (e.g., red, green, blue) for one pixel.

At step 120, the control unit selects a pulse-width value. In one embodiment, the pulse-width specifies how long an OLED element should be turned on during a frame refresh time if intensity data for the OLED element indicates an on state. Otherwise, if the intensity data indicates an off state, the OLED element may remain off during the frame refresh time. In another embodiment, the pulse-width specifies a duty-cycle relative to the frame refresh time for turning on the OLED element if the intensity data indicates an on state.

In certain embodiments, selecting the pulse-width value (or related duty-cycle value) comprises sequentially selecting a global intensity value from a fixed sequence of global intensity values. The selected global intensity value is applied to an entire frame on a per row basis before a subsequent global intensity value in the sequence is selected and applied to a following frame. In one embodiment, the fixed sequence of global intensity values includes sixteen values and is given by the sequence: (1, 1, 1, 3/8, 1, 1, 1, 3/16, 1, 1, 1, 3/32, 1, 1, 1, 3/64). The fixed sequence is repeated over successive sets of sixteen frames. This fixed sequence is illustrated below in FIG. 4.

In alternative embodiments, different fixed sequences may be implemented having, for example, a different sequence of the above stated values, or a different sequence length and different values. In other alternative embodiments, variable sequences may be implemented having variable lengths, variable values, or a combination thereof.

At step 130, the control unit drives a display device, such as low-latency display 210, to present the portion of the image using the pulse-width value (or duty cycle value) in conjunction with a pulse density modulation value generated by the modulation function. In one embodiment, presenting the portion of the image comprises storing a row of binary intensity values to the display device for display. Each stored binary intensity value within a row may be qualified, such as with a logical AND operation, with a pulse generated according to the pulse-width value. A resulting pulse of light from any given OLED element within the row therefore has a duration specified by the pulse-width value and placed in time within an associated refresh time. Each row of pixels within the display device flashes a binary pattern based on both the modulation function output and a pulse-width value from the sequence of global intensity values.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
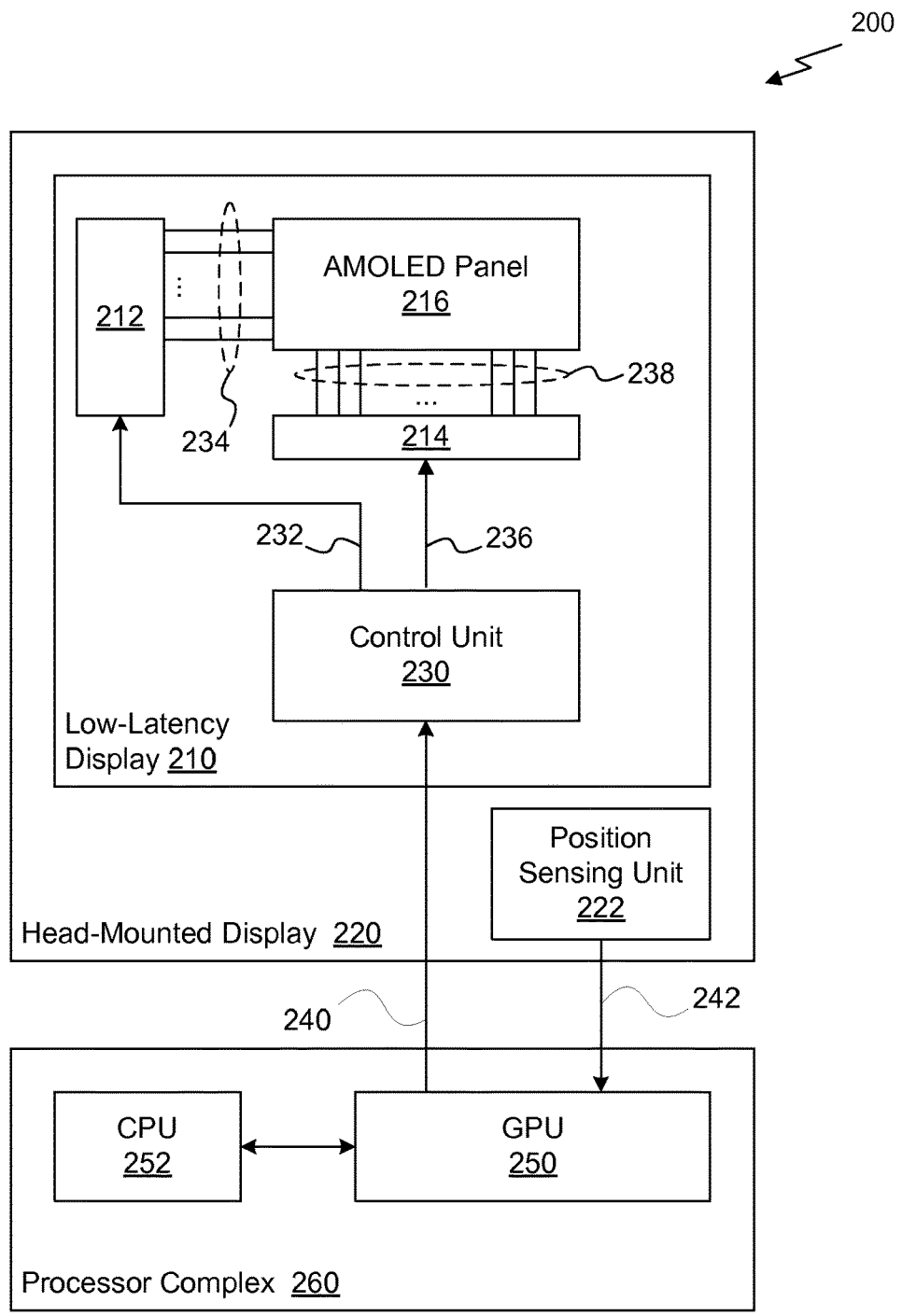
FIG. 2 illustrates a system that includes a low-latency display, in accordance with one embodiment.

FIG. 2 illustrates a system 200 that includes a low-latency display 210, in accordance with one embodiment. A head-mounted display 220 may comprise a position sensing unit 222 and one or more instances (e.g., left and right) of the low-latency display 210. The position sensing unit 222 may be configured to sense real-time position information 242 for the head-mounted display 220. The real-time position information 242 may include head position associated with a position of the head-mounted display 220, eye position associated with an eye or retina tracking sensor, or any combination thereof. The real-time position information 242 may be transmitted to a GPU 250 within a processor complex 260. The real-time position information 242 may be measured relative to a scene being continuously rendered by the GPU 250. Alternatively, the real-time position information 242 may be transmitted to a central processing unit (CPU) 252 within the processor complex 260; the CPU 252 may process the position information 242 to generate an updated set of camera positions for the GPU 250 to use in subsequently rendered scene information.

In one embodiment, low-latency display 210 includes an AMOLED panel 216 that includes a plurality of pixel elements, with each pixel element comprising a plurality of OLED elements corresponding to a plurality of color components (e.g., a red component, a green component, and a blue component). The OLED elements may be organized in a two-dimensional grid having rows and columns of OLED elements. Each row of OLED elements may be coupled to a corresponding row write-enable line. When the row write-enable line is driven to an active signal level, each OLED element in the row stores a corresponding column data signal, transmitted through an associated column data line. In one embodiment, the column data signal may indicate that the OLED element should be turned either on or off. When the row write-enable line is driven to an inactive signal level, the OLED elements in the row ignore column data signals.

The low-latency display 210 may include row drivers 212 and column drivers 214 for controlling the pixel elements in the AMOLED panel 216. The row drivers 212 may include circuitry for enabling a selected row to receive and store column data. The row drivers 212 enable the selected row by driving a corresponding row enable line of a plurality of row enable lines 234 to an active signal level. In addition to enabling specific rows within the AMOLED panel 216 to store data, row drivers 212 may also include circuitry to control brightness characteristics, such as average intensity, of the OLED elements. For example, in one embodiment, row drivers 212 include circuitry to enable OLED elements within a given row to display associated column data for the row for a configured duration or duty cycle, resulting in a full or partial average intensity contribution over a time interval. In an alternative embodiment, row drivers 212 include circuitry to enable the OLED elements within the row to display associated column data for the row at a specified intensity by controlling current available to the OLED elements.

The column drivers 214 may include circuitry for driving column data lines 238, configured to transmit column data signals 236 associated with the selected row to OLED elements comprising the AMOLED panel 216. Column data signals 236 for a given row may include a binary value for each OLED element that specifies whether the OLED element should be turned on or off, the binary value being transmitted to the OLED element through a corresponding column data line of column data lines 238.

A control unit 230 coordinates image refresh and data display on the AMOLED panel 216. Control unit 230 generates row select signals 232 and column data signals 236. In one embodiment, the row select signals 232 indicate which one of the plurality of row enable lines 234 is selected to be driven to an active signal level, thereby causing a corresponding row of OLED elements to receive column data from column data lines 238. Row select signals 232 may implement technically feasible encoding, such as an enable signal in conjunction with a binary row select signal, or a reset signal in conjunction with a row selection increment signal. Column data signals 236 are transmitted through column drivers 214 to corresponding columns of OLED elements in the AMOLED panel 216. Column data signals 236 may implement any technically feasible encoding, including a one-to-one encoding that maps individual column data bits and individual column data lines 238. When a selected row enable line 234 is driven to an active signal level, OLED elements in the associated row store signal levels for corresponding column data lines for display, while other OLED elements in other rows do not store column data.

Control unit 230 receives rows of video data 240 from GPU 250. In one embodiment, the control unit 230 implements the modulator function and receives video data 240 having target intensity values. In such an embodiment, the control unit 230 receives rows of video data 240 having intensity values (e.g., ten bit intensity values) per color channel per pixel and maps the intensity values to a corresponding binary sequence of on/off values and global intensity values presented in sequential frames to AMOLED panel 216. One embodiment of the modulator function is discussed in conjunction with FIG. 3 in greater detail.

In another embodiment, the video data 240 comprises binary pixel values having an on or off value for each color channel (e.g., red, green, blue) of each pixel within a row. In such an embodiment, GPU 250 implements a modulator function, such as a sigma-delta modulator function that maps instantaneous intensity values for each color channel of each pixel to a binary sequence of on/off values presented in sequential frames to AMOLED panel 216. A given binary sequence has an average value over the sequence of frames that corresponds to a target intensity value, which may include an arbitrary number of bits of intensity resolution. In certain embodiments, the instantaneous intensity values include a target intensity value having eight or more bits of intensity resolution. The modulator function may be implemented within the GPU 250 using custom hardware, a shader program, or a combination thereof. The shader program may be implemented as programming instructions stored within a non-transitory computer readable medium and executed by one or more processing units comprising the GPU 250.

The GPU 250 may be configured to sample the real-time position information 242 and compute an appropriate camera position for each low-latency display 210 prior to rendering one or more rows of additional scene information. In this way, each row is rendered and displayed according to a most recently sampled head position, thereby reducing effective total latency. Each rendered row may then be transmitted as video data 240 to the control unit 230 for display. The GPU 250 may render rows of image data based on 3D primitives defined by an application executing on CPU 252. The rows of image data may include pixel data stored in a local buffer, which is a portion of memory allocated to store pixel data that is utilized to generate and transmit video data 240. Sequential rows are rendered by the GPU 250 just ahead of those rows being displayed to reduce total latency. In such an embodiment, any one whole frame of rows may include one or more rows rendered based on a range of different camera positions, as indicated by position sensing unit 222.

Figure 3:
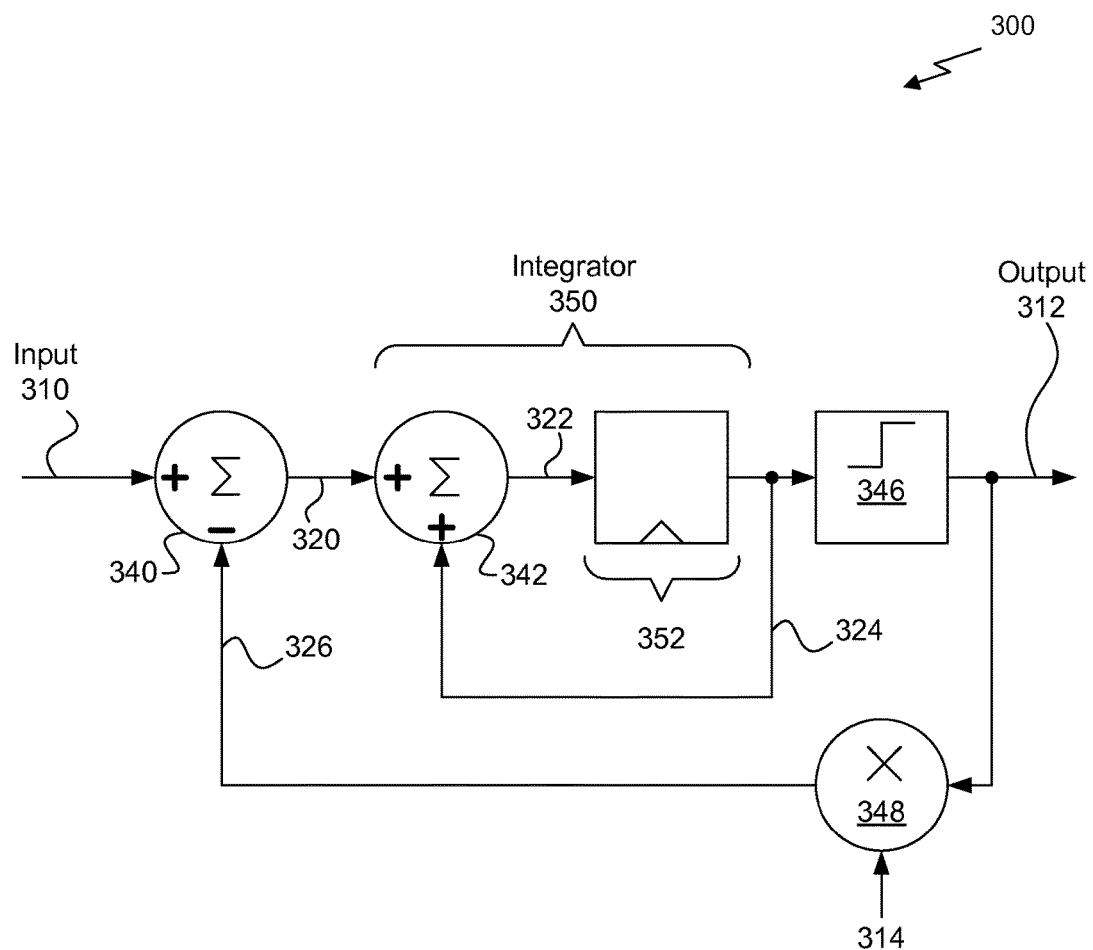
FIG. 3 illustrates a delta-sigma modulator function, in accordance with one embodiment.

FIG. 3 illustrates a delta-sigma modulator function 300, in accordance with one embodiment. The delta-sigma modulator function 300 receives a target intensity value at input signal 310, and maps the target intensity value to a sequence of binary scalars having a value of one or zero generated as output signal 312. The target intensity value may be one value from a range of possible values. For example, the target intensity value may be an eight-bit binary number having one of two to the eighth power (two-hundred fifty-six) different possible values. In one embodiment, the input signal comprises a binary number having eight or more bits of resolution corresponding to two to the eighth (or more) power different possible values. A global intensity 314 is applied to the output signal 312 to generate a feedback signal 326 that substantially correlates with average on/off time and consequently perceived intensity of a corresponding OLED element. The output signal 312 may be restricted to a value of one or zero at any one time, but has an average value over an appropriate number of time steps that is substantially equal to the target intensity value. In one embodiment, feedback signal 326 has a value of either zero when output 312 is equal to zero or the global intensity 314 when output signal 312 is equal to one.

As shown, delta-sigma modulator function 300 includes difference function 340, an integrator function 350, a threshold function 346, and a scale function 348. The difference function 340 subtracts feedback signal 326 from the target intensity value presented at input signal 310 to generate an integrator input signal 320. In one embodiment, the integrator input signal 320 represents an error signal, measured between a target intensity specified by input signal 310 for a corresponding OLED element and an actual displayed intensity by the OLED element. The integrator function 350 may accumulate values of the integrator input signal 320 over time to generate an integrator output signal 324. In one embodiment, the integrator function 350 includes a summation function 342 and a state storage function 352. The storage function 352 may be configured to store integrator output signal 324, generated by accumulating the error signal associated with the integrator input signal 320.

The threshold function 346 generates a binary value of one when the integrator output signal 324 is at or above a specified threshold and a binary value of zero when the integrator output signal 324 is below the specified threshold. In one embodiment, the specified threshold is a fixed constant approximately equal to one half the numeric range of output signal 324. For example, in an implementation where output signal 324 may range from 0.0 to 1.0, the specified threshold may be a fixed constant substantially equal to 0.5. In such an implementation, threshold function 346 generates an output signal 312 equal to one when the integrator output signal 324 is above the specified threshold and zero otherwise. In alternative embodiments, the specified threshold may comprise a programmable constant. Scale function 348 may be configured to generate feedback signal 326 by scaling output signal 312 according to global intensity 314. In this way, feedback signal 326 represents a perceived intensity for a corresponding OLED element during a given time interval, such as a frame time. In one embodiment, scale function 348 comprises an arithmetic multiplier circuit.

During normal operation, when the average value of the output signal 312 falls below the target intensity value, the output signal 312 is driven to a value of one, thereby increasing the average value towards the value of the target intensity value. Otherwise, when the average value of the output signal 312 is above the target intensity value, the output signal 312 is driven to a value of zero, thereby decreasing the average value towards the value of the target intensity. In general, the output signal 312 may be characterized as a sequence of binary pulses having varying width with exhibiting an average over multiple frame times that converges on a target intensity value.

In one embodiment, delta-sigma modulator function 300 implements a digital-to-analog conversion function for generating column data signals 236 used to drive the AMOLOED panel 216 of low-latency display 210. Each color channel of each pixel for each of the one or more instances of the low-latency display 210 has an associated output signal 324 and corresponding state storage function 352. In one embodiment, the state storage function 352 comprises memory bits within an embedded random-access memory (RAM), such as a static ram (SRAM) or dynamic RAM (DRAM). In other embodiments, the state storage function 352 comprises external storage elements, such as memory bits within an external memory device, such as an external DRAM device. In certain embodiments, delta-sigma modulator function 300 is implemented within control unit 230. In other embodiments, delta-sigma modulator function 300 is implemented within GPU 250.

Figure 4:
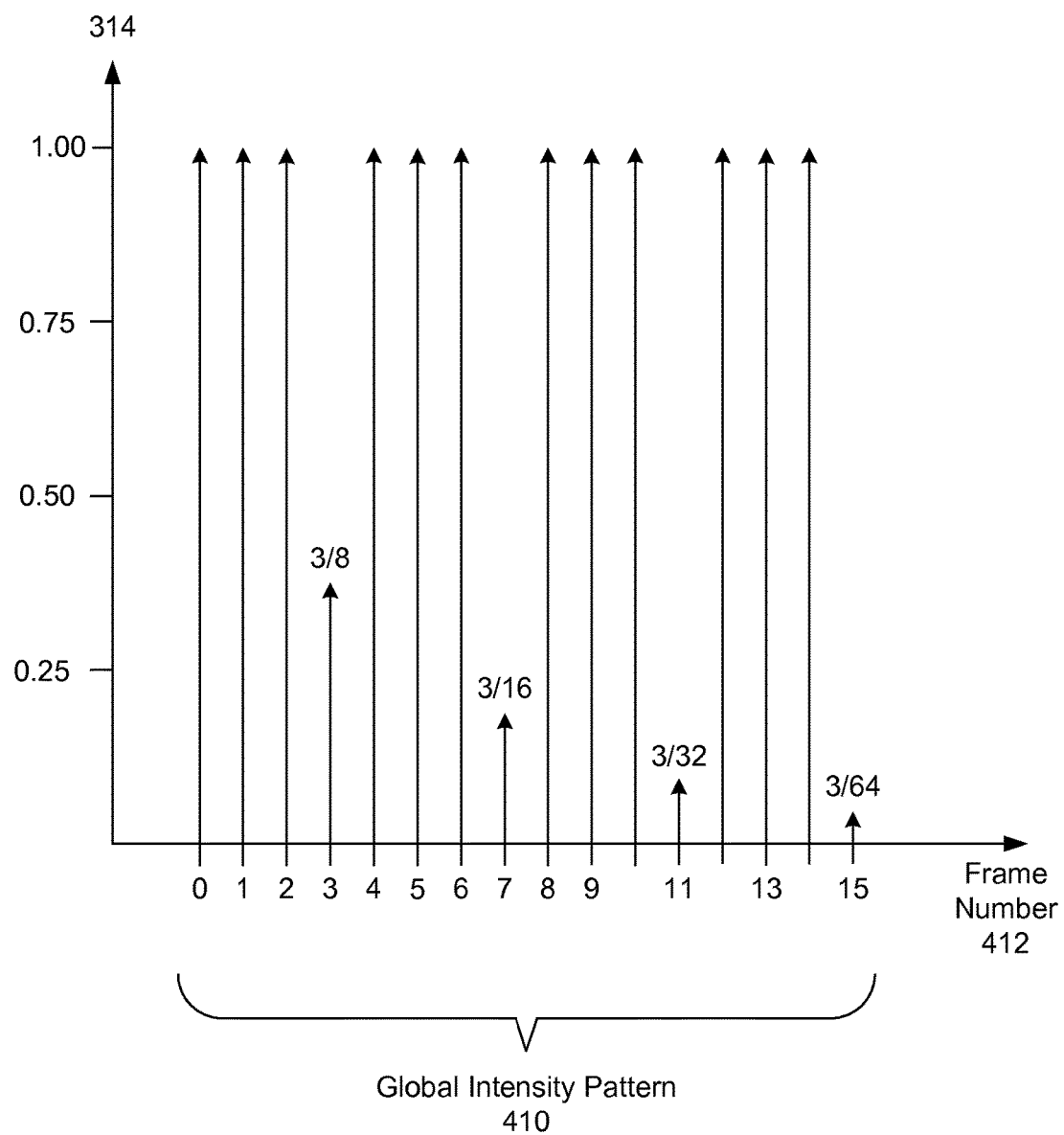
FIG. 4 illustrates a global intensity in sequential frames, in accordance with one embodiment.

FIG. 4 illustrates a global intensity 314 in sequential frames, in accordance with one embodiment. As shown, the global intensity 314 associated with any particular frame number 412 follows a global intensity pattern 410. The global intensity pattern 410 follows a repeating pattern specified above as (1, 1, 1, 3/8, 1, 1, 1, 3/16, 1, 1, 1, 3/32, 1, 1, 1, 3/64). After frame number fifteen, the pattern repeats, starting with frame zero.

Delta-sigma modulator systems typically require an output low-pass filter to substantially remove high-frequency temporal noise added by the modulation process. Consequently, one characteristic of delta-sigma modulation is the loss of high-frequency detail due to the integration function. In the context of a two-dimensional image display, the human visual system may provide the temporal low-pass filter function, and a loss of temporal high-frequency detail may be perceived as motion tails as objects within a scene move. Such motion tails are due in part to the loss of modulator temporal frequency response associated with the multi-frame global intensity sequence. An object within a scene may move because an associated application needs to move the object. Furthermore, an entire scene displayed within a head-mounted display may move because a user moves their head. Additionally, certain perceived aspects of a scene may effectively move because a user moves their eyes and directs their attention to a different portion of a scene. In each case, a motion tail may be formed as perceived motion occurs.

To reduce visible motion tail formation, delta-sigma modulator state should track scene motion to transport error state according to any relative motion between screen space and a retina space. In other words, the delta-sigma state within screen space needs to move such that it follows the retina location in screen space. For example, each pixel may include modulator state for red, green, and blue color channels, and scene information represented by a given pixel may move from a first position to a second position within a scene. To reduce tail artifacts associated with the movement of the scene information, modulator state should be similarly transported with the motion of the scene information. In general, modulator state should follow object movement to provide ongoing integration with portions of a scene being viewed by a user. In this way, any given unit of scene information approximately corresponding to a pixel will be represented substantially identically as a sequence of pulse density modulation pulses regardless of which particular pixel the scene information happens to be mapped to in any particular frame. In one embodiment, modulator state associated with a pixel is moved only after the pixel has been displayed on a row.

In one embodiment, a retina position in screen space includes a center position as well as a rotation angle. The retina position may map to any center position in screen space and the rotation angle accounts for potential eye rotation relative to screen space. High-frequency, high resolution eye tracking techniques may provide real-time center position tracking as well as rotation angle tracking. Alternatively, coarse eye tracking may be used to determine which image feature a user is likely looking at and motion associated with the image feature may be used as a proxy for the user's retina motion relative to screen space. In an alternative embodiment, modulator state is moved for each pixel based on image content motion, which may be defined by a corresponding motion vector for each pixel.

Figure 5:
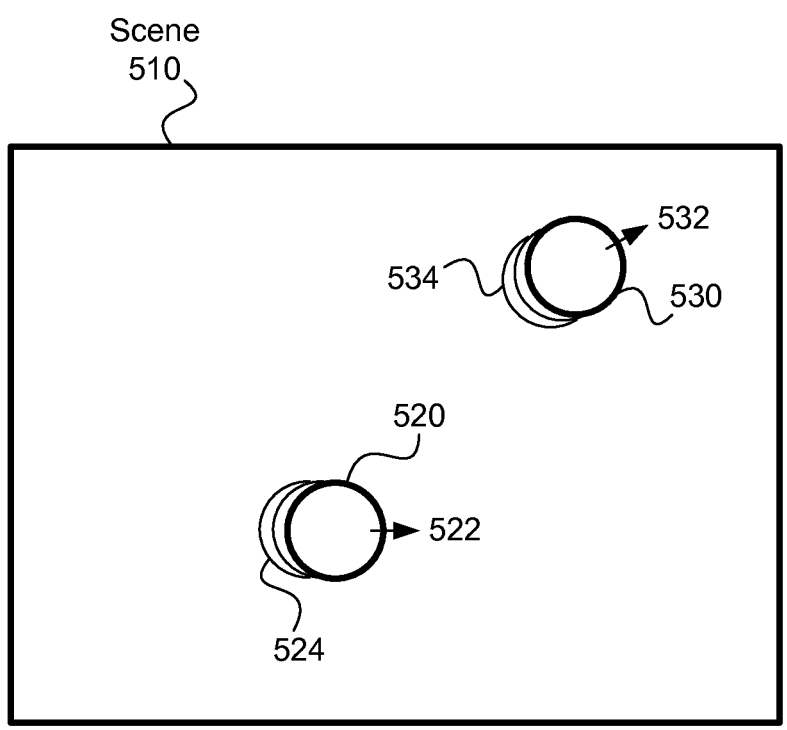
FIG. 5 illustrates delta-sigma modulator state motion tracking, in accordance with another embodiment.

FIG. 5 illustrates delta-sigma modulator state motion tracking, in accordance with another embodiment. Two objects 520, 530 are shown rendered within a graphics scene 510. Object 520 follows motion vector 522 from an original position 524. The modulator state for pixels comprising the object 520 needs to follow the object 520 to the new position. Similarly, object 530 follows motion vector 532 from an original position 534, and modulator state needs to similarly follow object 530. In the case of whole scene motion, the modulator state may be mapped to an updated camera position using any technically feasible technique, such as re-sampling the state through a motion vector field computed by an appropriate transform on the scene to reflect updated camera positions. In the case of object motion within an otherwise stationary scene, screen space motion vectors may be provided by a rendering pipeline within GPU 250. In one embodiment, the screen space motion vectors and modulator state are stored within a memory coupled to GPU 250, such as memory 610 of FIG. 6.

Figure 6:
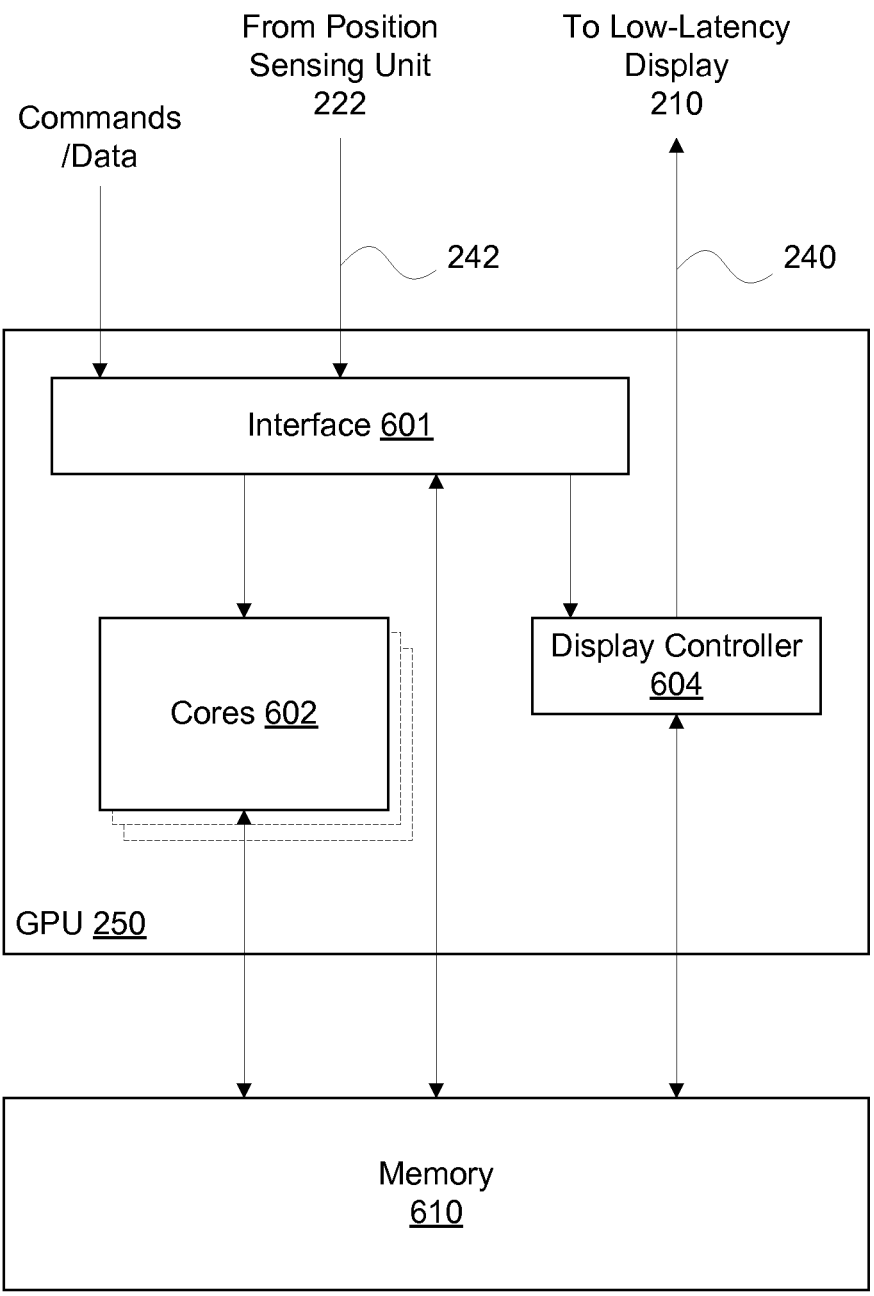
FIG. 6 illustrates the operation of the GPU of FIG. 2, in accordance with one embodiment.

FIG. 6 illustrates the operation of the GPU 250 of FIG. 2, in accordance with one embodiment. The GPU 250 may receive real-time position information 242 and adjust one or more camera positions used for rendering one or more newly rendered rows. As real-time position information 242 indicates ongoing changes in head-mounted display 220, the GPU 250 may continue to update the one or more camera positions used to render one or more subsequent rows. In practice, the one or more camera positions may change continuously during the rendering and display time of one complete frame, and one or more rows may be rendered according to a different camera position than a previous row.

GPU 250 may be coupled to a memory 610. The memory 610 may be a synchronous dynamic random access memory (SDRAM) configured to store data accessible to the GPU 250. In one embodiment, the memory 610 is a dedicated video memory that is only accessible by the GPU 250. In another embodiment, the memory 610 is a system memory that is shared between CPU 252 and the GPU 250.

The GPU 250 may receive commands and data from CPU 252 via the interface 601. The interface 601 may be, e.g., a PCIe (Peripheral Component Interconnect Express) interface that enables the GPU 250 to communicate with the CPU and/or a system memory via a bus (not explicitly shown). The GPU 250 may also include one or more cores 602 that process data based on the commands and/or programming instructions that may be stored within the GPU 250 or within memory 610, or within any technically feasible memory subsystem. Each core 602 may be multi-threaded to process multiple data in parallel. In one embodiment, the cores 602 have a SIMD (Single-Instruction, Multiple Data) architecture. In SIMD architectures, a plurality of processing units process different data based on the same instruction. In another embodiment, the cores 602 have a MIMD (Multiple-Instruction, Multiple Data) architecture. In MIMD architectures, a plurality of processing units process different data based on different instructions scheduled on each processing unit. In yet another embodiment, the cores 602 have a SIMT (Single-Instruction, Multiple-Thread architecture. In SIMT architectures, a plurality of processing units process a plurality of related threads, each thread having the same instructions configured to process different data, but each thread capable of branching independently. In other words, individual threads may be masked to prevent execution of certain instructions in SIMT architectures. This enables conditional execution of the instructions associated with the plurality of threads. The GPU 250 may also include a display controller 604 that is configured to transmit video data 240, such as according to a specification of a particular video signal interface. The display controller 604 may read the image data from a row or frame buffer in the memory 610 and convert the values stored in the row or frame buffer into video data 240.

The various embodiments described above may be implemented in the graphics processor 706 and display 708 of system 700, described below.

Figure 7:
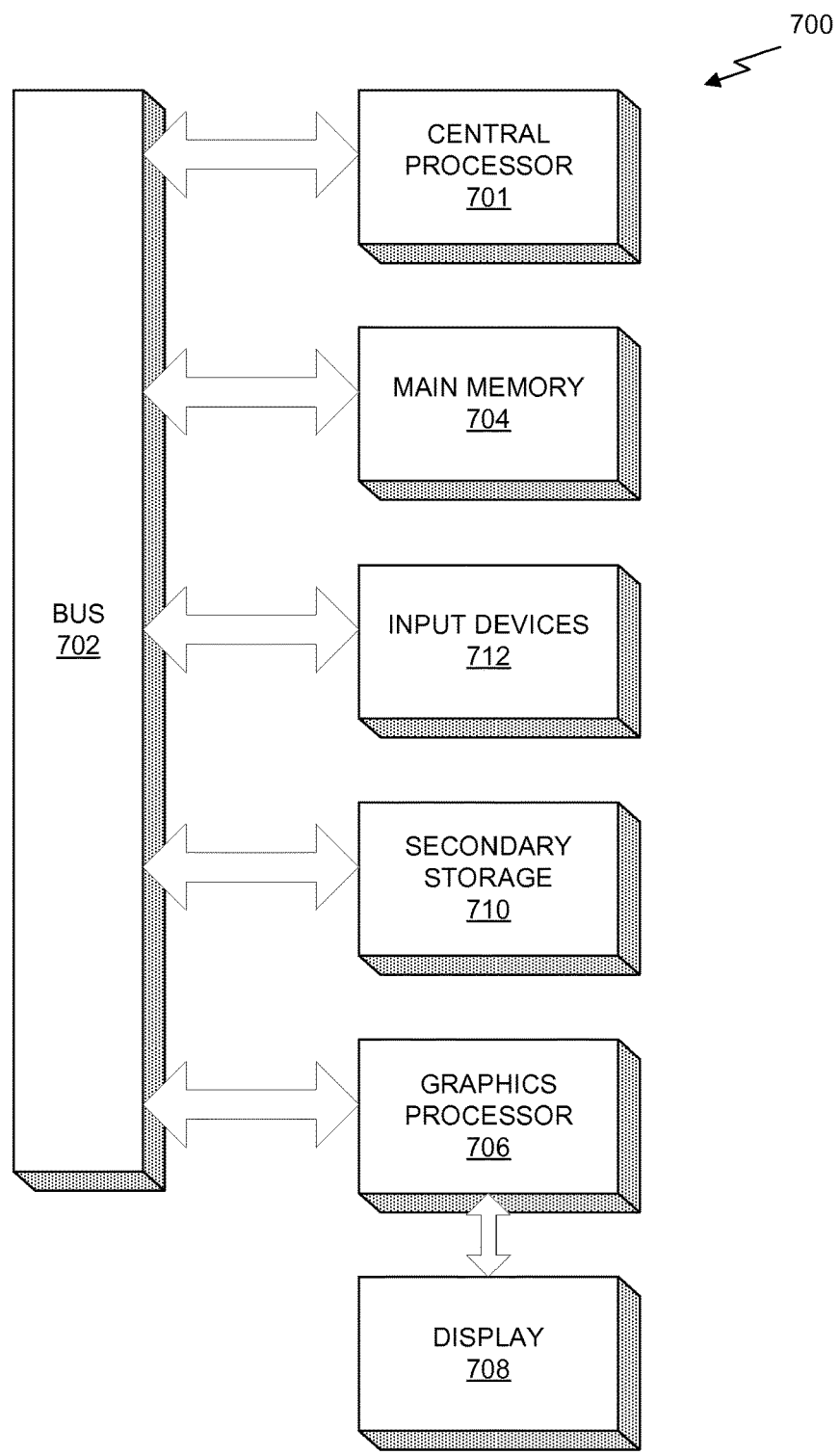
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. the low-latency display 210. In one embodiment, the graphics processor 706 comprises the GPU 250 and the central processor 701 comprises the CPU 252. User input may be received from the input devices 712, e.g., keyboard, mouse, touchpad, microphone, and the like. In one embodiment, input devices 712 include position sensing unit 222. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a portion of an image for display, wherein the portion of the image comprises a first row of pixels associated with a first camera position and a second row of pixels associated with a second camera position that is different compared with the first camera position:
selecting a pulse-width value for displaying the portion of the image based on a target intensity value and a feedback signal;
generating a sequence of binary scalars each having a value of either one or zero based on the pulse-width value; and
driving a low-latency display device to present the portion of the image using the sequence of binary scalars, wherein the feedback signal comprises the sequence of binary scalars multiplied by a global intensity value
wherein the global intensity value is updated to a subsequent global intensity value in a repeating sequence for each frame time.

2. The method of claim 1,
wherein the sequence is: 1, 1, 1, 3/8, 1, 1, 1, 3/16, 1, 1, 1, 3/32, 1, 1, 1, 3/64.

3. The method of claim 1, wherein the sequence of binary scalars is generated by a delta-sigma modulator function.

4. The method of claim 3, wherein the delta-sigma modulator function comprises a difference function coupled to an integrator function, and a threshold function coupled to the integrator function.

5. The method of claim 3, wherein the delta-sigma modulator function comprises an integrator function having a state storage function configured to store modulator state for each pixel of the low-latency display device.

6. The method of claim 1, wherein driving the low-latency display device comprises storing a row of intensity data within the low-latency display device and enabling the low-latency display device to present the row of intensity data according to the sequence of binary scalars.

7. The method of claim 1, wherein the low-latency display device is an active-matrix OLED (AMOLED) display.

8. The method of claim 1, wherein a control unit within the low-latency display device is configured to select the pulse-width value and generate the sequence of binary scalars.

9. The method of claim 1, wherein a graphics processing unit (GPU) is configured to render three-dimensional primitives in a graphics scene to generate the portion of the image for display.

10. The method of claim 9, wherein the GPU is further configured to render the first row of pixels according to the first camera position computed from real-time position information and the second row of pixels according to the second camera position computed from the real-time position information.

11. The method of claim 1, wherein the sequence of binary scalars is computed for each pixel of the low-latency display device based on pixel velocity vectors associated with each of the pixels, and rendered by a GPU.

12. The method of claim 1, wherein the global intensity value is used for each pixel in the image for a frame time.

13. The method of claim 1, wherein the low-latency display device is driven at a frame rate greater than or equal to 1700 frames per second.

14. The method of claim 1, wherein the sequence of binary scalars follows movement of an object in a scene.

15. A non-transitory computer-readable storage medium storing instructions that, when executed by a processor, cause the processor to:
receive a portion of an image for display, wherein the portion of the image comprises a first row of pixels associated with a first camera position and a second row of pixels associated with a second camera position that is different compared with the first camera position:
select a pulse-width value for displaying the portion of the image based on a target intensity value and a feedback signal;
generate a sequence of binary scalars each having a value of either one or zero based on the pulse-width value; and
drive a low-latency display device to present the portion of the image using the sequence of binary scalars, wherein the feedback signal comprises the sequence of binary scalars multiplied by a global intensity value
wherein the global intensity value is updated to a subsequent global intensity value in a repeating sequence for each frame time.

16. A system, comprising:
a low-latency display device; and
a control unit coupled to the low-latency display device and configured to:
receive a portion of an image for display, wherein the portion of the image comprises a first row of pixels associated with a first camera position and a second row of pixels associated with a second camera position that is different compared with the first camera position;
select a pulse-width value for displaying the portion of the image based on a target intensity value and a feedback signal; and
drive the low-latency display device to present the portion of the image using the sequence of binary scalars, wherein the feedback signal comprises the sequence of binary scalars multiplied by a global intensity value
wherein the global intensity value is updated to a subsequent global intensity value in a repeating sequence for each frame time.

17. The system of claim 16, further comprising a graphics processing unit (GPU) coupled to the low-latency display device and configured to:
render three-dimensional primitives in a graphics scene to generate the portion of the image for display; and
render pixel velocity vectors associated with each of the pixels in the portion of the image.

18. The system of claim 17, wherein the graphics processing unit (GPU) is further configured to implement a delta-sigma modulator function for computing the sequence of binary scalars.

19. The system of claim 16, wherein the low-latency display device is an active-matrix OLED (AMOLED) display coupled to a head-mounted display.

* * * * *